(12) United States Patent
Southwood

(10) Patent No.: US 6,781,703 B1
(45) Date of Patent: Aug. 24, 2004

(54) WIREFRAME ALGORITHM AND NON-CONTACT GAUGING APPARATUS

(75) Inventor: Mark E. Southwood, Vancouver, WA (US)

(73) Assignee: Schmitt Measurement Systems, Inc., Portland, OR (US)

(*) Notice: Subject to any disclaimer, the term of this patent is extended or adjusted under 35 U.S.C. 154(b) by 275 days.

(21) Appl. No.: 10/044,209

(22) Filed: Jan. 11, 2002

(51) Int. Cl.[7] .............................................. G01B 11/24
(52) U.S. Cl. ...................... 356/602; 431/6; 250/559.23
(58) Field of Search ................................ 356/601–613, 356/337–343, 600, 625, 631, 635; 250/559.22, 559.23, 559.24, 559.27; 451/5, 6

(56) References Cited

U.S. PATENT DOCUMENTS

| | | | |
|---|---|---|---|
| 2,481,993 A | 9/1949 | Fuss ............................ 175/320 |
| 3,060,421 A | 10/1962 | Rideout ........................... 343/5 |
| 3,258,688 A | 6/1966 | Augustine et al. .......... 324/58.5 |
| 3,490,037 A | 1/1970 | Williams ..................... 324/58.5 |
| 3,514,703 A | 5/1970 | Soga ........................... 324/58.5 |
| 3,749,500 A | 7/1973 | Carlson et al. .............. 356/156 |
| 3,802,774 A | 4/1974 | Eschler et al. ................... 356/4 |
| 3,897,156 A | 7/1975 | Chasson ....................... 356/157 |
| 4,045,727 A | 8/1977 | Yu et al. ..................... 324/58.5 |
| 4,053,237 A | 10/1977 | Casey .......................... 356/209 |
| 4,201,476 A | 5/1980 | Musto et al. ................ 356/386 |
| 4,501,095 A | 2/1985 | Drinkuth et al. .......... 51/165.72 |
| 4,503,327 A | 3/1985 | Wilson ......................... 250/261 |
| 4,509,295 A | 4/1985 | Böttcher et al. ................ 51/49 |
| 4,623,835 A | 11/1986 | Mehdizadeh et al. ....... 324/58.5 |
| 4,693,038 A | 9/1987 | Vetter ...................... 51/165.72 |
| 4,775,236 A | 10/1988 | Cohen et al. ................ 356/387 |
| 4,854,707 A | 8/1989 | Ring et al. ................... 356/356 |
| 4,880,991 A | 11/1989 | Boehnlein et al. .......... 250/560 |
| 4,931,658 A | 6/1990 | Tole ............................ 250/560 |
| 4,989,984 A * | 2/1991 | Salinger ...................... 356/445 |
| 4,991,308 A | 2/1991 | Donaldson ................. 33/555.1 |
| 5,175,595 A | 12/1992 | Fukase ........................ 356/387 |
| 5,480,342 A | 1/1996 | Bannayan et al. ............. 451/5 |
| 5,521,707 A * | 5/1996 | Castore et al. .............. 356/394 |
| 5,625,446 A | 4/1997 | Bedard ....................... 356/3.08 |
| 5,703,362 A | 12/1997 | Devitt et al. .............. 250/341.8 |
| 5,717,210 A | 2/1998 | Bexelius et al. .......... 250/341.2 |
| 5,746,644 A | 5/1998 | Cheetham ....................... 451/6 |
| 5,800,247 A | 9/1998 | Harms ............................ 451/5 |
| 5,841,546 A | 11/1998 | Carangelo et al. ........... 356/445 |
| 6,062,948 A | 5/2000 | Schiff et al. ................... 451/9 |

\* cited by examiner

Primary Examiner—Richard A. Rosenberger
Assistant Examiner—Vincent P. Barth
(74) Attorney, Agent, or Firm—John R. Thompson; Stoel Rives LLP

(57) ABSTRACT

A non-contact gauging system and method profiles a workpiece to accurately determine cylindrical surface profiles. The system includes a sensor head for performing reflected light measurements. The sensor head couples to a sensor arm that is movable in longitudinal, lateral, and transverse directions. A computer controls operation of the sensor head and arm to perform various proximity measurements of the workpiece. Proximity measurements are made along at least three parallel, lateral tracks that extend along a longitudinal length of the workpiece surface. The sensor head takes proximity measurements as it is moved continuously along each lateral track. The computer determines the diameters of the workpiece along the longitudinal length based on the proximity measurements and generates a profile.

24 Claims, 6 Drawing Sheets

WIREFRAME ALGORITHM AND NON-CONTACT GAUGING APPARATUS

BACKGROUND

1. The Field of the Invention

The invention is directed to a non-contact gauging apparatus and, more specifically, to a method for performing surface profiling of a workpiece.

2. The Background Art

Cylindrical workpieces are used throughout manufacturing to operate in rotating machinery such as assembly line machinery or in turbines used in power generation or propulsion. Such workpieces may have the shape of a cylinder or cone, or have circularly symmetric parts of irregular axial cross section. A workpiece may have a crown portion, a concave portion, or a multiplicity of both. Workpieces range in sizes from two inches in diameter to several feet in diameter depending on the function or application of the workpiece.

For quality control and assessment, accurate measurements of the workpiece provide information about the dimensions. During use, the workpiece may undergo wear and strain that alters its dimensions in order to ensure quality performance, it is necessary to periodically take accurate measurements of the workpieces. It is further necessary to perform diameter measurements before machining a workpiece in order to accurately apply a grinding wheel to obtain the target diameters. After the machining process it is desirable to measure the shape of the workpiece as a record and to ensure quality control of the process.

Diameter measurements have been conventionally performed through the use of micrometers or calipers that encircle the workpiece so as to come into contact with opposing side surfaces. This process is difficult and time consuming and requires the expertise of a skilled operator performing the measurement. Since mechanical surface contact is required for micrometers and calipers to work, slight fluctuations in surface texture introduce error in measurement. The contours of the workpiece may make contact gauging instruments impossible to use due to the lack of positive engagement between the contacting surfaces of the instruments with the workpieces. A further disadvantage is that contact with the workpiece creates undue wear on the workpiece which cause deformities in the workpiece.

More sophisticated measurement methods introduce the use of non-contact gauging by measuring the intensity of light reflected from a workpiece surface. Such a non-contact system is disclosed in U.S. Pat. No. 6,062,948 to Schiff et al. which is hereby incorporated by reference. Non-contact gauging systems are effective in determining a diameter at a position along a longitudinal axis of the workpiece.

In order to better ascertain the dimensions of a workpiece, it is desirable to obtain the entire profile of a workpiece. Profiling requires numerous diameter measurements along the longitudinal length of the workpiece. The more diameter measurements that are performed, the more accurate the profile of the workpiece will be. Conventional methods require that the measuring equipment be positioned at various locations along a longitudinal axis for each diameter measurement. Thus, with even non-contact gauging systems, profiling a workpiece is time consuming, repetitive, and subject to operator error.

It would be an advancement in the art to provide a non-contact gauging system that efficiently, expeditiously, and accurately profiles a workpiece surface. It would be a further advancement to provide such a system that provides an operator interface that is easily understood. Such a system and method are disclosed herein.

BRIEF SUMMARY

The invention is directed towards a non-contact gauging system and method to profile a workpiece. The system includes a sensor head having a light source and a detector for receiving and determining the intensity of a portion of reflected light. A non-contact sensor enjoys the benefits of increased speed in measuring, superior accuracy, and reduced wear on the workpiece. The sensor head couples to a sensor arm that is movable in longitudinal, lateral, and transverse directions.

The system further includes a computer having a processor and a memory with instruction code. The computer is in communication with the sensor head and the sensor arm to control their operation. The memory includes a sensor arm module to control movement of the sensor arm and a sensor head module to control operation of the sensor head. The memory further includes a wireframe module that determines the diameters of the workpiece and generates a workpiece profile.

The sensor arm and sensor head modules direct the sensor arm and sensor head to perform proximity measurements of the workpiece surface. The proximity measurements are made along at least three parallel, lateral tracks that extend along a longitudinal length of the workpiece surface. The sensor head takes proximity measurements as it is moved continuously along each lateral track. During movement, the sensor head directs a beam of light to the workpiece surface and measures the intensity of reflected light to determine the proximity.

The sensor head sends signals indicative of the proximity measurements to the computer. The wireframe module determines the diameters of the workpiece along the longitudinal length based on the proximity measurements and generates a workpiece profile. Based on the proximity of the sensor to the workpiece at various lateral positions, the computer performs geometrical calculations to determine the diameter at a longitudinal position. Determining diameters of the workpiece along the longitudinal length of the workpiece allows the computer to determine a profile of the workpiece.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
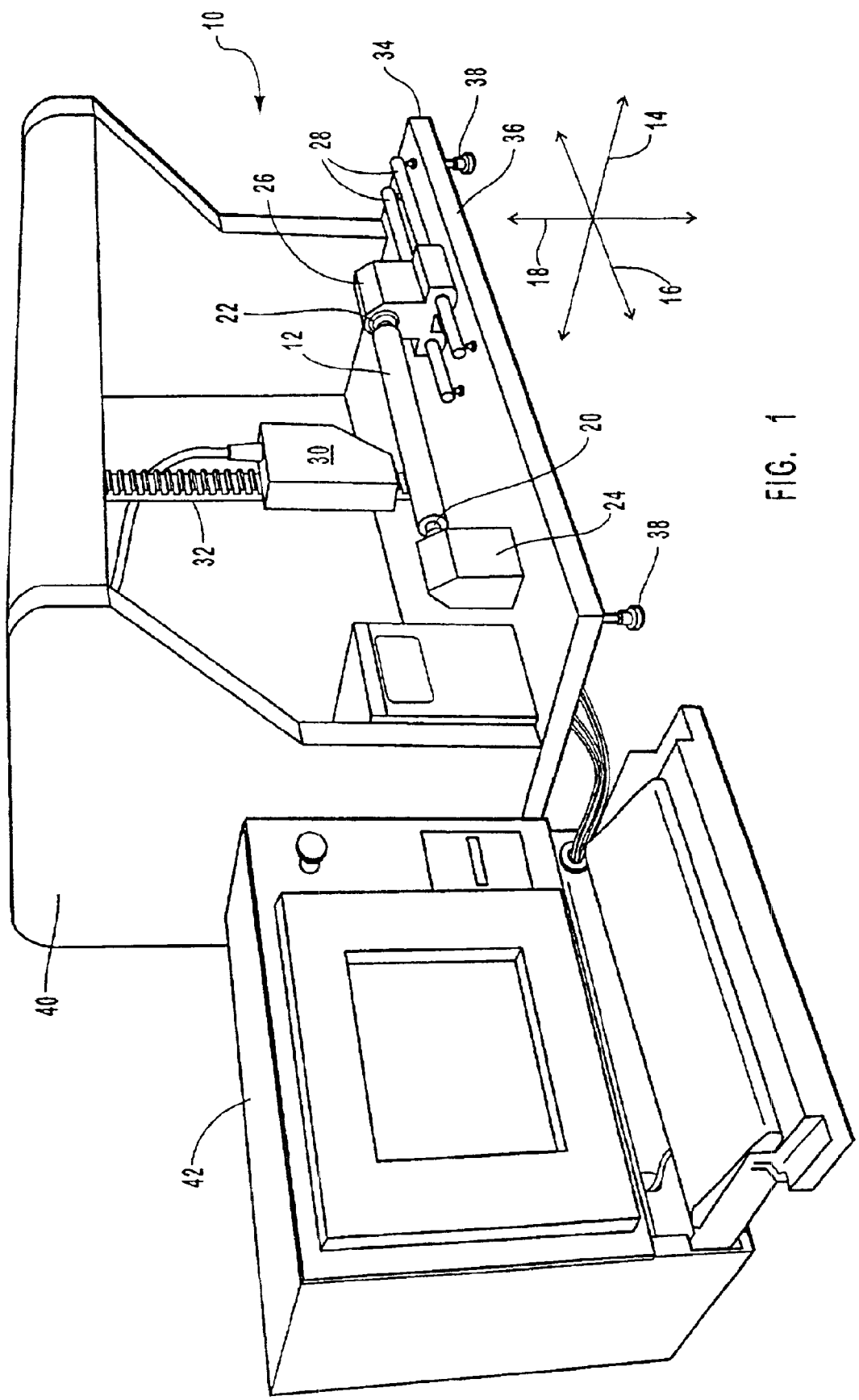
FIG. 1 is a perspective view of one embodiment of the non-contact profiling system of the present invention.

Referring to FIG. 1, a perspective view of one embodiment of the profiling system 10 of the present invention is shown. A three axis Cartesian coordinate system with reference to a workpiece 12 will be used in describing the invention. The "x-axis" refers to a lateral direction 14 direction relative to the workpiece 12. The "y-axis" refers to a longitudinal direction 16 relative to the workpiece 12. The "z-axis" refers to a transverse or vertical direction 18 relative to the workpiece. Positive directions are referenced as being right, forward, and up respectively, as is customary in geometry.

FIG. 1 illustrates the workpiece 12 mounted within the non-contact profiling system 10. The workpiece 12 may be any number of various nominally cylindrical geometric shaped parts or rolls which are machined or measured for various industrial purposes. A workpiece 12 may have the general shape of a cylinder, cone, or have circularly symmetric parts of irregular axial cross section. The system 10 is able to generate an accurate and reliable profile of the workpiece 12.

The workpiece 12 may be mounted on journals 20, 22 as is common in the practice. The journals 20, 22 may in turn be mounted on journal rests 24, 26. A journal rest 26 maybe disposed on a track 28 that allows for longitudinal adjustment to accommodate workpieces 12 of various longitudinal lengths.

The system 10 further includes a sensor head 30 which is the operative device for performing measurements of the surface of the workpiece 12. The sensor head 30 includes a light source (not shown) for directing a beam of light onto the surface of the workpiece 12. The sensor head 30 further includes one or more detectors (not shown) that receive and detect light scattered from the surface of the workpiece 12. The sensor head 30 includes apertures in proximity to the surface to allow light to exit, impact the surface, and enter the sensor head 30 for detection.

The sensor head 30 couples to a sensor arm 32 which moves the sensor head 10 relative to the workpiece 12 in longitudinal, lateral, and transverse directions 14, 16, 18. The sensor arm 32 may be embodied in various ways to enable movement of the sensor head 10. In one embodiment, the sensor arm 32 may include longitudinal, lateral, and transverse rail drives. Each rail drive may include a servo motor controlled by a rotary encoder. The sensor arm 32 may be driven by a pneumatic system as is well known in the art.

One of skill in the art will appreciate that other embodiments for the sensor arm 32 are possible and are included within the scope of the invention.

The sensor arm 32 and the journal rests 24, 26 may be supported by a support stand 34. The shape and size of the support stand 34 is designed as needed to accommodate the system 10. The support stand 34 includes a horizontal platform 36 which is secured to and supported by a suitable number of legs 38.

The system 10 may further include a hood 40 that may rise from the support stand 34 and extend over the sensor head 30. The hood 40 shields the sensor head 30 from direct ambient light. Shielding from direct ambient light reduces interference in the measurement process.

The system 10 may further include a programmable computer 42 which is in electrical communication with the sensor head 30 and the sensor head arm 32. The computer 42 includes instruction code for controlling the light sensing functions performed by the sensor head 32. The computer 42 further reviews measurement data produced by the sensor head 32 to perform proximity and roughness computations and generate a workpiece profile as described in further detail below. The computer 42 further controls movement of the sensor head arm 32 to place the sensor head 30 in appropriate positions.

Figure 2:
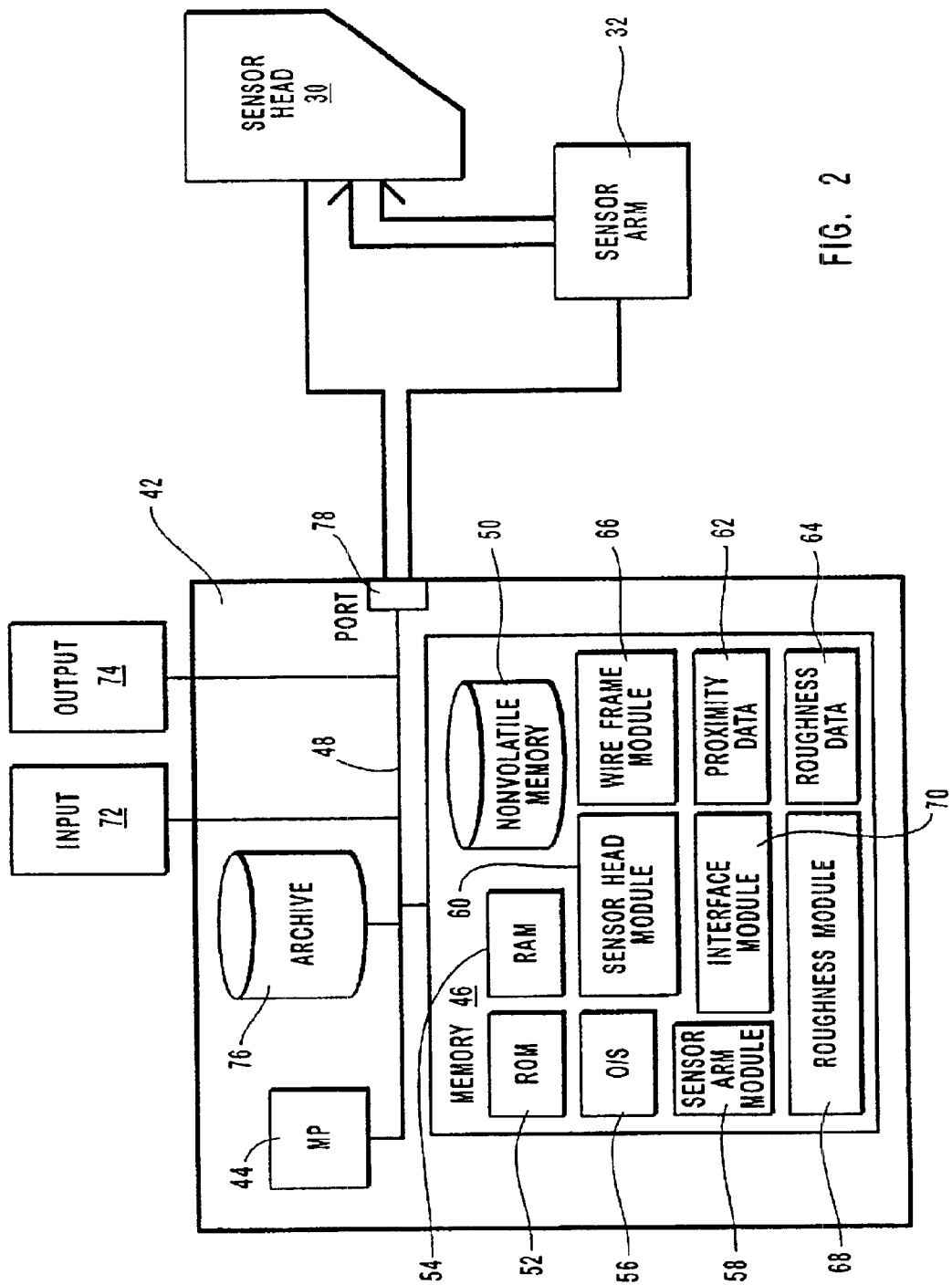
FIG. 2 is a block diagram of various components of the non-contact profiling system of the present invention.

Referring to FIG. 2, a block diagram of components of one embodiment of the computer 42 are shown. The computer 42 includes a processor 44 that is in electrical communication with a memory 46 through a bus 48. The bus 48 operably interconnects various internal components of the computer 42 and may be thought of as a data carrier. As such, the bus 48 may be embodied in numerous configurations. Wire, fiber optic line, wireless electromagnetic communications by visible light, infrared, and radio frequencies may likewise be implemented as appropriate for the bus 48.

The memory 46 may include one or more memory devices such as a non-volatile memory 50, a read-only memory (ROM) 52, and a random access memory (RAM) 54. The memory 46 further contains instruction code or modules for performing various functions in accordance with the present invention. The modules are illustrated as being generally resident within the memory 46 although they may reside in whole or in part within any of the above mentioned memory devices.

In general, the represented modules include executable code and operational data. As used herein, the term executable code, or merely "executable," is intended to include any type of computer instruction and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different memory devices or locations which together comprise the module and achieve the purpose stated for the module. An executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different memory devices or locations.

The memory 46 may include a general purpose operating system 56 such as DOS, Windows, or Linux operating system. The memory 46 may further include a sensor arm module 58 that provides executables for moving the sensor arm 32 to desired locations and to perform desired movements. The memory 46 further includes a sensor head module 60 having executables for instructing and controlling operation of the sensor head 30.

During operation, the sensor head 30 generates signals that are indicative of the proximity and roughness of a workpiece surface. These signals are received by the computer 42 and stored as proximity data 62 and roughness data 64 in the memory 46.

The memory 46 further includes a wireframe module 66 having executable code for determining proximity measurements based on proximity data 62 at various longitudinal and lateral positions. The executable code of the wireframe module 66 may be generally referred to as a wireframe algorithm. The wireframe module 66 computes tracks that extend longitudinally (hereinafter referred to as "longitudinal tracks") and that conform to the external surface of the workpiece 12. The wireframe module 66 further determines diameters of the workpiece 12 at various longitudinal positions as will be explained below. The wireframe module 66 combines the longitudinal tracks with the diameters to generate a wireframe model for the workpiece 12. Based on the wireframe model, the wireframe module 66 generates a workpiece profile.

The memory 46 further includes a roughness module 68 for determining the surface roughness of the workpiece 12 based on the roughness data 64. The roughness module 68 may store the surface roughness in correspondence to a surface position.

The memory 46 further includes an interface module 70 that provides input and output interface operations for a user. The interface module 70 may generate a graphical user interface (GUI) to facilitate user operations. Through the interface module 70 a user may input commands and desired parameters for measurement operations. Measurement results and workpiece profiling may be returned through operation of the interface module 70.

The computer 42 includes an input device 72 for receiving inputs from a user and may include one or more embodiments. By way of example, the input device 72 may be a keyboard, mouse, microphone, touch screen or other devices known in the art. The computer 42 further includes an output device 74 such as a monitor, printer, speakers, and so forth to display or otherwise convey information to a user.

The computer 42 may further include an archive 76 in communication with the bus 48 or remote to the computer 42. The archive 76 may be considered as independent from the memory 46 or may be included within the memory 46. The archive 76 serves as a long term memory storage and contains a history for workpieces 12 that have been measured by the system 10. Thus, a history of a workpiece profile and roughness may be maintained for future retrieval and comparison.

The bus 48 is in communication with one or more ports 78 that provide communication to the sensor head 30 and to the sensor arm 32. The processor 44 processes the sensor arm module 58 and the sensor head module 60 and generates signals to control operation of the sensor arm and head 32, 30.

Figure 3:
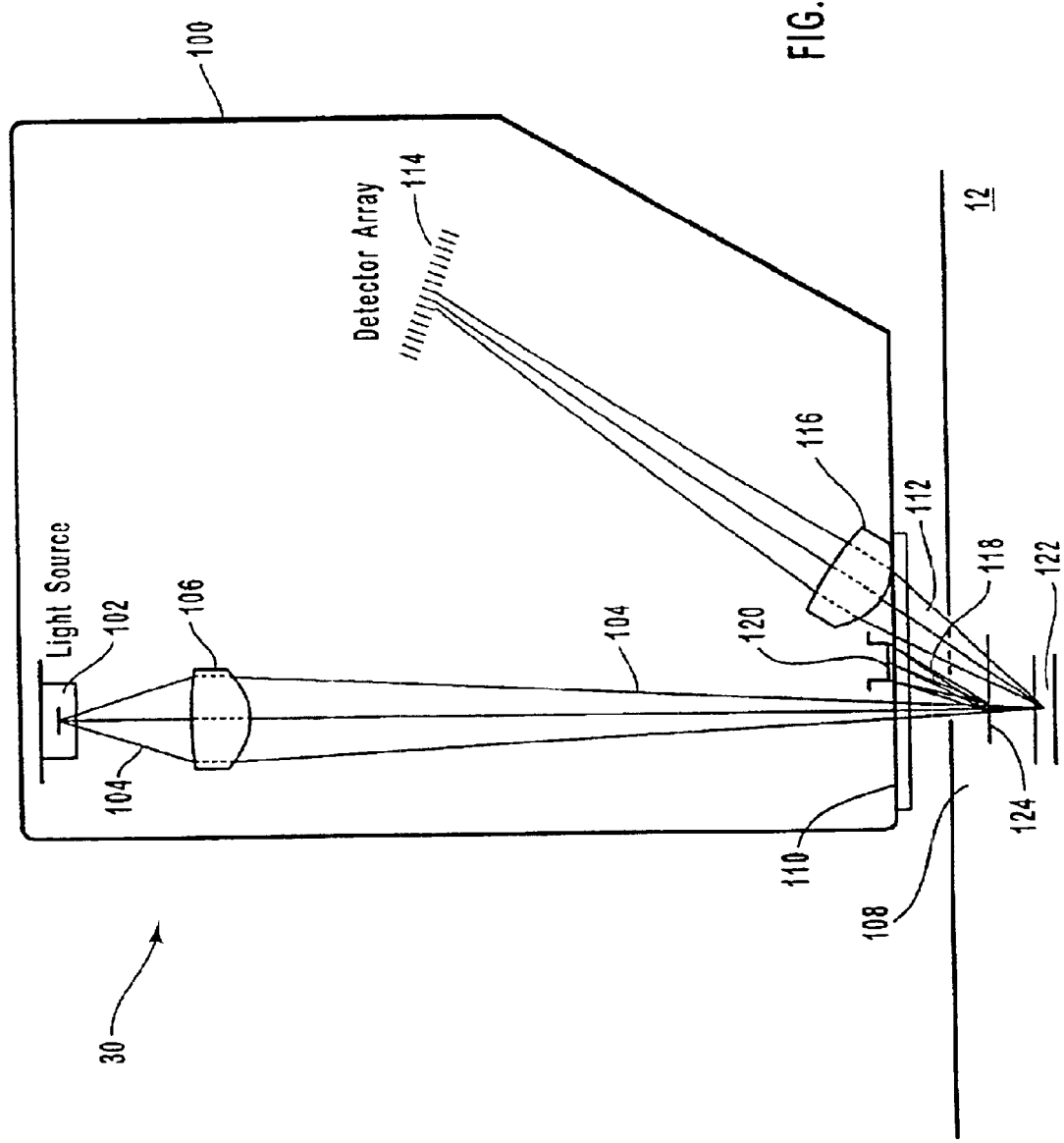
FIG. 3 is a block diagram of one embodiment of a sensor head for use with the non-contact profiling system of the present invention.

Referring to FIG. 3, a block diagram of the sensor head 30 is shown. The sensor head 30 comprises a sensor head body 100 that contains the components of the sensor head 30. The sensor head 30 includes a light source 102 which may generate visible or non-visible light. Such sources are commonly known and the sensor head 30 relies upon operations of scatter and reflectance of light to perform distance measurements. In one embodiment, the light source 102 may be a 670 laser. One of skill in the art will appreciate that other forms of light sources may also be suitable and are included within the scope of the invention. A light sensor has the advantage of superior measuring speed, accuracy, and reduced wear to the workpiece 12 due to non-contact.

The beam of light 104 may pass through an optic 106 that directs the beam 104 to the surface 108 of the workpiece 12. The sensor head 30 may be configured with an aperture 110 through which the beam 104 exits the head 30. The beam 104 contacts the surface 108 and produces reflected light. A portion of the reflected light 112 reflects at a certain angle, passes through the aperture 110, and impacts a detector array 114. The sensor head 30 may include a second optic 116 that focuses the portion of the reflected light to the detector array 114. The detector array 114 generates a signal indicative of the proximity of the sensor head 30 to the surface 108. One of skill in the art will appreciate that the optics 106, 116 may be various kinds of lenses or reflective optics.

A second portion of the reflected light 118 may be captured by a scatter sensing detector 120. The scatter sensing detector 120 generates a signal indicating the amount and intensity of captured light. By knowing the intensity of the beam 104 and the intensity of the second portion 118, the roughness of the surface 108 may be determined.

The first portion of light 112 may originate at a location that is referred to as a position sensing location 122. The second portion of light 118 may originate at a location that is referred to as a roughness sensing location 124. Both locations 122, 124 are within an area impacted by the beam 104. The roughness sensing location 124 may be closer to the surface 108 than the position sensing location 122. Roughness measurements are more accurate at closer ranges because of the effects of the ambient light and the incident angle.

The light source 102, detector array 114, and scatter sensing detector 120 are in communication with the computer 42 to convey signals for operation. The computer 42 through the sensor head module 60 effects operation of the light source 102. The detector array 114 and the scatter sensing detector 120 transmit signals indicative of their respective measurements to the computer 42 for processing.

Figure 4:
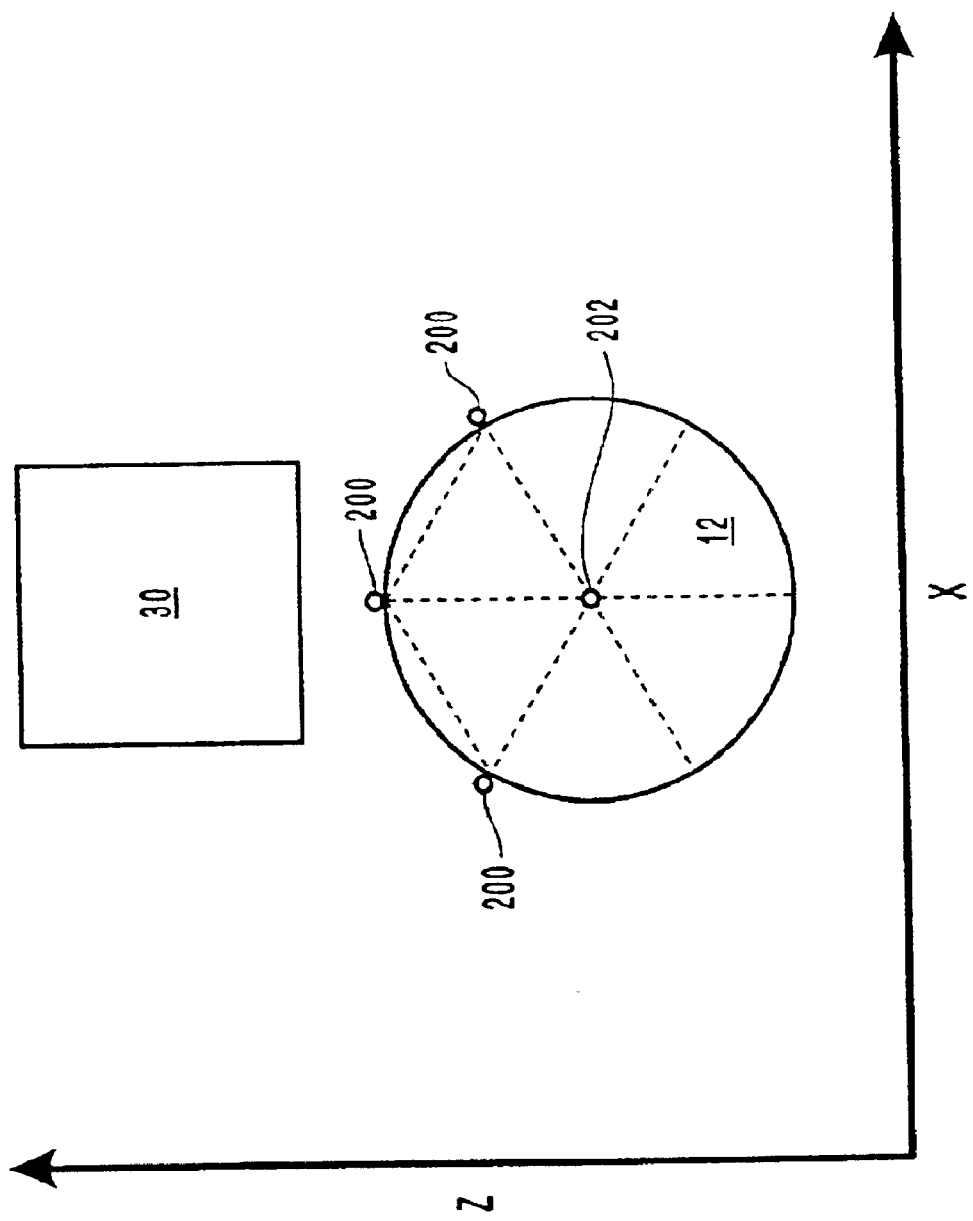
FIG. 4 is a side view of a workpiece and sensor head as viewed from the lateral and transverse axes.

Referring to FIG. 4, a cross-sectional view of the workpiece 12 is shown to illustrate a process for determining the diameter of the workpiece 12 at a longitudinal location. The sensor head 30 is positioned above the workpiece 12 to take a plurality of proximity measurements. The proximity measurements have different lateral positions 200 along the x-axis but have approximately the same longitudinal position along the y-axis.

By taking proximity measurements at at least three lateral positions 200, the diameter of the workpiece 12 may be determined for the corresponding longitudinal position. Proximity measurements at additional lateral positions 200 increases the accuracy of the diameter calculation. Calculation of the diameter based on proximity measurements may be done by various methods. In one method, at least three proximity measurements of the exterior surface curve of the workpiece 12 are made at indicated locations 200. Signals indicative of the proximity measurements are sent and stored as proximity data 62. The wireframe module 66 assumes and approximates a circle which will "fit" to the given locations 200. This method is herein referenced as computing a "curve fit" of the workpiece 12. Based on the curve fit the wireframe module 66 is able to determine the center 202 based on geometric principles. Once the center 202 is determined, the radius and diameter of the workpiece 12 for the longitudinal location are readily determined. As can be appreciated, additional proximity measurements at other lateral locations will increase the reliability of the curve fit method.

Figure 5:
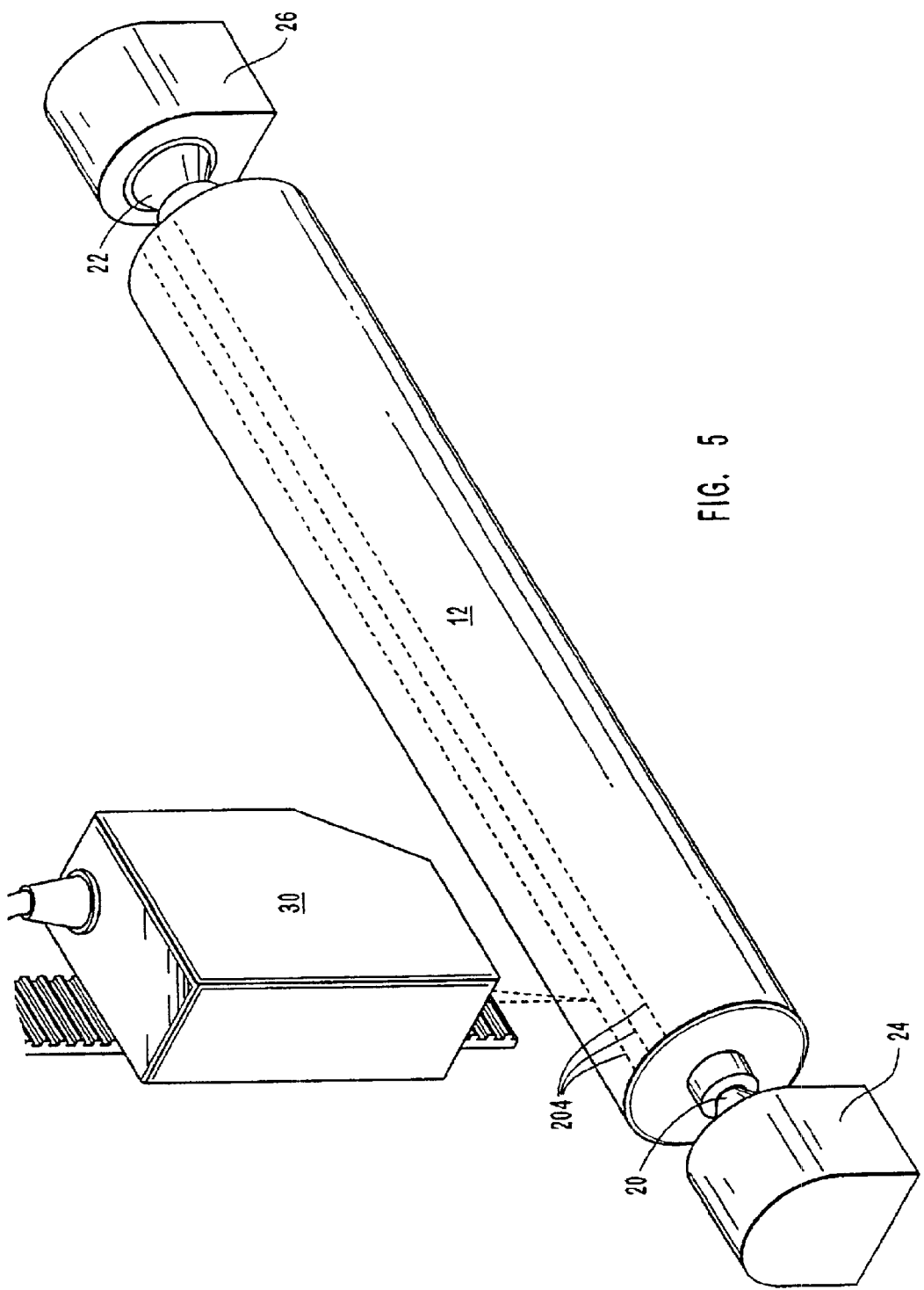
FIG. 5 is a perspective view of the workpiece relative to the sensor head to illustrate one method of operation in accordance with the present invention.

Referring to FIG. 5, a perspective view of the workpiece 12 in relation to the sensor head 30 is shown to illustrate a profiling method of the present invention. A user places the workpiece 12 in the journals 20, 22 which are positioned in journal rests 24, 26. Alignment measurements may be performed to ensure that the alignment of the workpiece 12 is true relative to the system 10. In one process, the user may input the approximate dimensions of the workpiece 12, such as the length and the diameter. The user may also enter coordinates of both longitudinal ends of the workpiece 12. This allows the sensor arm module 58 to compute an estimated starting position for the sensor head 30. Thus, if the diameter of the workpiece 12 is 20", then an approximate starting distance may be 12" above the center of the workpiece 12.

The sensor head 30 may pass along multiple longitudinal tracks 204 to profile the workpiece 12. A longitudinal track 204 extends along a longitudinal length of the workpiece 12, conforms to the exterior surface of the workpiece 12, and maintains the same lateral coordinate as it extends. Longitudinal tracks 204 run parallel to one another, have different lateral coordinates, and are approximately the same length. The longitudinal tracks 204 may extend along a portion or entire length of the workpiece 12.

As the sensor head 30 passes along the longitudinal tracks 204, the sensor head 30 takes proximity measurements. In operation, the sensor head 30 passes continuously along each longitudinal track 204. The sensor head 30 is capable of taking proximity measurements at different longitudinal coordinates while the sensor head 30 moves rather than pausing for each measurement. New measurements are constantly taken as previous measurements are stored as proximity data 62. In this manner, the system 10 quickly and efficiently measures along a longitudinal track without interruption or delay.

After measuring along a longitudinal track 204, the sensor head 30 may then position itself at an end of another longitudinal track 204. The sensor head 30 then proceeds without interruption along the next longitudinal track 204 and takes proximity measurements. Lateral positions for each longitudinal track 204 may be determined by the computer 42 or manually entered.

While performing proximity measurements, the sensor head 30 may also simultaneously measure the roughness of the surface 108 of the workpiece 12. Thus, the sensor head 30 may move continuously in proximity to a track 204 and perform both proximity and roughness measurements. The computer 42 receives signals indicative of the intensity of the second portion of scattered light 118 and stores them as roughness data 64. The roughness data 64 is then used by the roughness module 68 to compute surface roughness using methods well known in the art.

The system 10 takes proximity measurements for at least three longitudinal tracks 204 to enable diameter calculation. Signals indicative of proximity are stored as proximity data 62. The wireframe algorithm 66 processes the proximity data 62 and determines the diameters of the workpiece 12 at various longitudinal coordinates using the curve fit method. In this manner, the system 10 is capable of determining diameters along the entire longitudinal length of the workpiece 12 to profile the workpiece 12. A resulting profile of the workpiece 12 provides reliable information as to the form of the workpiece 130. By generating a profile, the wireframe algorithm 66 determines the position of crowns and concavities as well as "sag" in a workpiece 12.

A profile of the workpiece 12 may be associated with a workpiece identifier and a data and time. The profile may then be stored in an archive 76 for future review. A user may enter an identifier, such as a serial number, into the computer 42 and the computer 42 accesses the archive 76 and returns with the last measured dimensions of the identified workpiece 12. A comparison may be made of profiles over time to review wear on a workpiece 12. The dimensions of the workpiece 12 may be compared with the archived dimensions to determine the wear rate. Archiving the dimensions of a workpiece 12 allows traceability to give a complete history of the workpiece 12 which is useful for reprocessing of workpieces 12.

Furthermore, the computer 42 may be in electrical communication with a network of computers. In a network, the workpiece 12 profile may be stored in a network file to allow access to the workpiece 12 profile by other computer terminals on the network. In many instances, a hard copy, memory storage, and network storage will all be used to store a record of the workpiece 12 profile. These options in storage facilitate tracking of the workpiece 12 profile and adherence to quality control systems such as ISO 9001 and Statistical Process Control.

Figure 6:
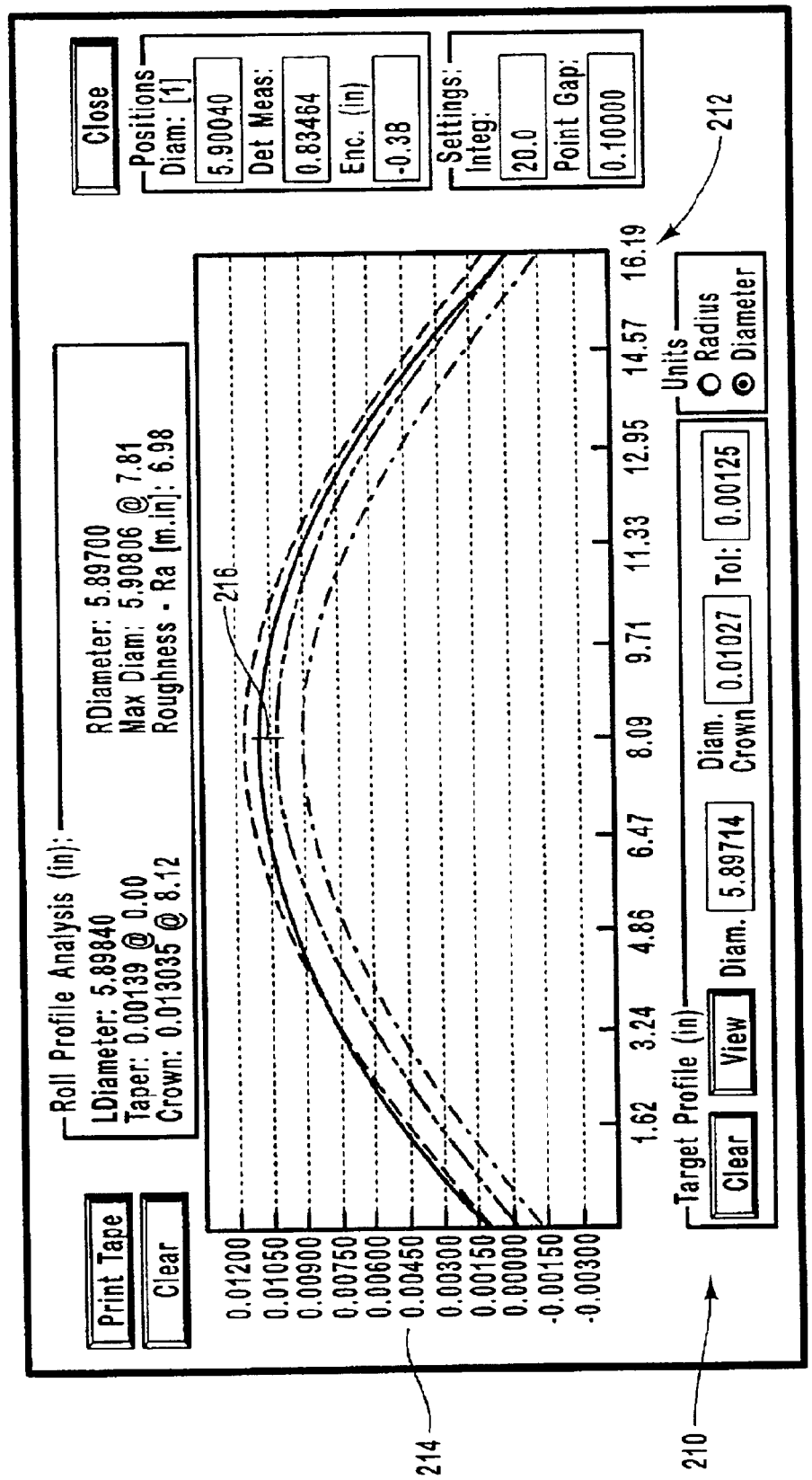
FIG. 6 is one embodiment of a graphical output to illustrate a workpiece profile.

Referring to FIG. 6, an output 210 is shown that is representative of a workpiece profile. A profile may be sent from the wireframe algorithm 66 to the interface module 70 which generates the output 210. In one embodiment, the longitudinal length of the workpiece 12 may be shown along the y-axis 212 and the diameters may be shown along the x-axis 214. Suitable units of measurement may be used to convey longitudinal position and corresponding diameters. The output 210 illustrates the taper of the workpiece 12 and the location of a crown or concavity. The output 210 may also identify location of the zenith 216 of a crown or concavity in a workpiece 12. The roughness module 68 may send roughness data 64 to the interface module 70 which is incorporated into the output 210.

The output 210 may be modified by user input to display the profile according to given parameters. Thus, the units may be changed or certain longitudinal areas may be magnified to better illustrate the taper. The output 210 may also be modified to display radii rather than diameters. One of skill in the art will appreciate that the output 210 may be configured to various formats and the invention is not limited to the embodiment of FIG. 6.

A hard copy of the output 210 may be printed on a printer along with any other pertinent information. The hard copy could be secured to the workpiece 12 to allow future users immediate access to information about the workpiece 12.

The present invention provides an efficient and accurate system and method for profiling a workpiece. The sensor head takes a series of proximity measurements through uninterrupted passes along lateral tracks of the workpiece surface. Continuous measurements substantially increases the speed of the profiling process. The proximity measurements are processed by the computer to determine diameters along the longitudinal axis and produce a surface profile.

The computer outputs a surface profile to the user that illustrates taper and the locations of crowns or concavities.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention.

What is claimed is:

1. A system for non-contact dimensional measurement of an essentially circularly symmetric workpiece, comprising:
   a processor;
   a memory coupled to the processor and including a sensor arm module, a sensor head module, and a wireframe module;
   a sensor arm movable in lateral, longitudinal, and transverse directions and in communication with the processor; and
   a sensor head coupled to the sensor arm, the sensor head including,
      a light source for producing a light to contact a surface of the essentially circularly symmetric workpiece, and
      a detector for sensing a portion of reflected light from the workpiece, the detector
   generating a signal indicative of the proximity of the workpiece,
   wherein the sensor arm and head modules direct the sensor arm and sensor head to perform proximity measurements along three parallel, lateral tracks extending along a longitudinal length by moving the sensor head in proximity to and continuously along each lateral track,
   wherein the wireframe module determines a curve fit of the workpiece based on the proximity measurements and further determines the diameters of the workpiece along the longitudinal length the centers corresponding to the diameters, and generates a workpiece profile.

2. The system of claim 1, wherein the light source comprises a laser light diode.

3. The system of claim 1, wherein the wireframe module determines the location of a crown of the workpiece based on the diameters.

4. The system of claim 1, wherein the sensor head further comprises a roughness detector configured to receive a second portion of reflected light and generate a signal indicative of the roughness of the surface of the workpiece.

5. The system of claim 1, wherein the detector generates signals indicative of the proximity of the surface of the workpiece based on the intensity and position of the portion of the reflected light.

6. The system of claim 1, wherein the sensor head further comprises a focusing optic for directing light emitted from the light source to the surface of the workpiece.

7. The system of claim 1, further comprising an optic configured to direct the portion of reflected light to the detector.

8. The system of claim 1, further comprising an archive for storing diameters and workpiece profiles.

9. The system of claim 1, wherein the memory further comprises an interface module for receiving user input and displaying diameters and the workpiece profile.

10. A method for determining the diameter measurements of an essentially circularly symmetric workpiece to generate a workpiece profile, the method comprising:
    locating three parallel, lateral tracks on a surface of the essentially circularly symmetric workpiece, each track extending along a longitudinal length;
    moving a sensor head along the three lateral tracks, wherein movement along each track is substantially continuous;
    directing light from a single light source on the sensor head to the three lateral tracks along the longitudinal length;
    measuring the intensity and position of a portion of reflected light from the surface of the workpiece along the three lateral tracks to determine proximity measurements;
    determines a curve fit of the workpiece based on the proximity measurements;
    determining the diameters of the workpiece along the longitudinal length, and the centers corresponding to the diameters, based on the proximity measurements; and
    generating a workpiece profile based on the diameters of the workpiece.

11. The method of claim 10 further comprising computing the slope of the workpiece along the longitudinal length.

12. The method of claim 10 further comprising:
    measuring the intensity of a second portion of reflected light from the surface of the workpiece to determine a roughness measurement; and
    computing the roughness of the surface of the workpiece based on the roughness measurement.

13. The method of claim 10 further comprising storing the workpiece profile in an archive.

14. The method of claim 10 wherein the light source comprises a laser light diode.

15. The method of claim 10 further comprising determining the location of a crown of the workpiece based on the workpiece profile.

16. The method of claim 10, further comprising focusing light emitted from the light source to the surface of the workpiece.

17. The method of claim 10, further comprising displaying diameters and a workpiece profile for the workpiece.

18. A computer readable medium having stored thereon computer executable instructions for performing a method for determining diameters of an essentially circularly symmetric workpiece to generate a workpiece profile, the method comprising:
    locating three parallel, lateral tracks on a surface of the essentially circularly symmetric workpiece, each track extending along a longitudinal length;
    moving a sensor head along the three lateral tracks, wherein movement along each track is substantially continuous;
    directing light from a single light source on the sensor head to the three lateral tracks along the longitudinal length;
    measuring the intensity and position of a portion of reflected light from the surface of the workpiece along the three lateral tracks to determine proximity measurements;
    determines a curve fit of the workpiece based on the proximity measurements;
    determining the diameters of the workpiece along the longitudinal length, and the centers corresponding to the diameters, based on the proximity measurements; and generating a workpiece profile based on the diameters of the workpiece.

19. The computer readable medium of claim 18 wherein the method further comprises computing the slope of the workpiece along the longitudinal length relative to the single light source.

20. The computer readable medium of claim 18, the method farther comprising:

measuring the intensity of a second portion of reflected light from the surface of the workpiece to determine a roughness measurement; and computing the roughness of the surface of the workpiece based on the roughness measurement.

21. The computer readable medium of claim 18, the method further comprising storing the workpiece profile in a memory.

22. The computer readable medium of claim 18, the method further comprising determining the location of a crown of the workpiece based on the workpiece profile.

23. The computer readable medium of claim 20, the method further comprising displaying diameters and the workpiece profile.

24. A system for non-contact dimensional measurement of a an essentially circularly symmetric workpiece rotated about a longitudinal axis, comprising:

processing means;

memory means coupled to the processing means and including sensor control means and a wireframe means; and sensing means movable in lateral, longitudinal, and transverse directions and in communication with the processing means, the sensing means including, light source means for producing a light to contact a surface of the essentially circularly symmetric workpiece, and detecting means for sensing a portion of reflected light from the workpiece, the detecting means generating a signal indicative of the proximity of the workpiece, wherein the sensor control means directs the sensing means to perform proximity measurements along three parallel, lateral tracks extending along a longitudinal length by moving the sensing means in proximity to and continuously along each lateral track, wherein the wireframe means determines a curve fit of the workpiece based on the proximity measurements and further determines the diameters of the workpiece along the longitudinal length, the centers corresponding to the diameters, and generates a workpiece profile.

* * * * *